March 24, 1942.  A. P. STEINER  2,277,167
BEARING
Filed Nov. 24, 1939   3 Sheets-Sheet 1
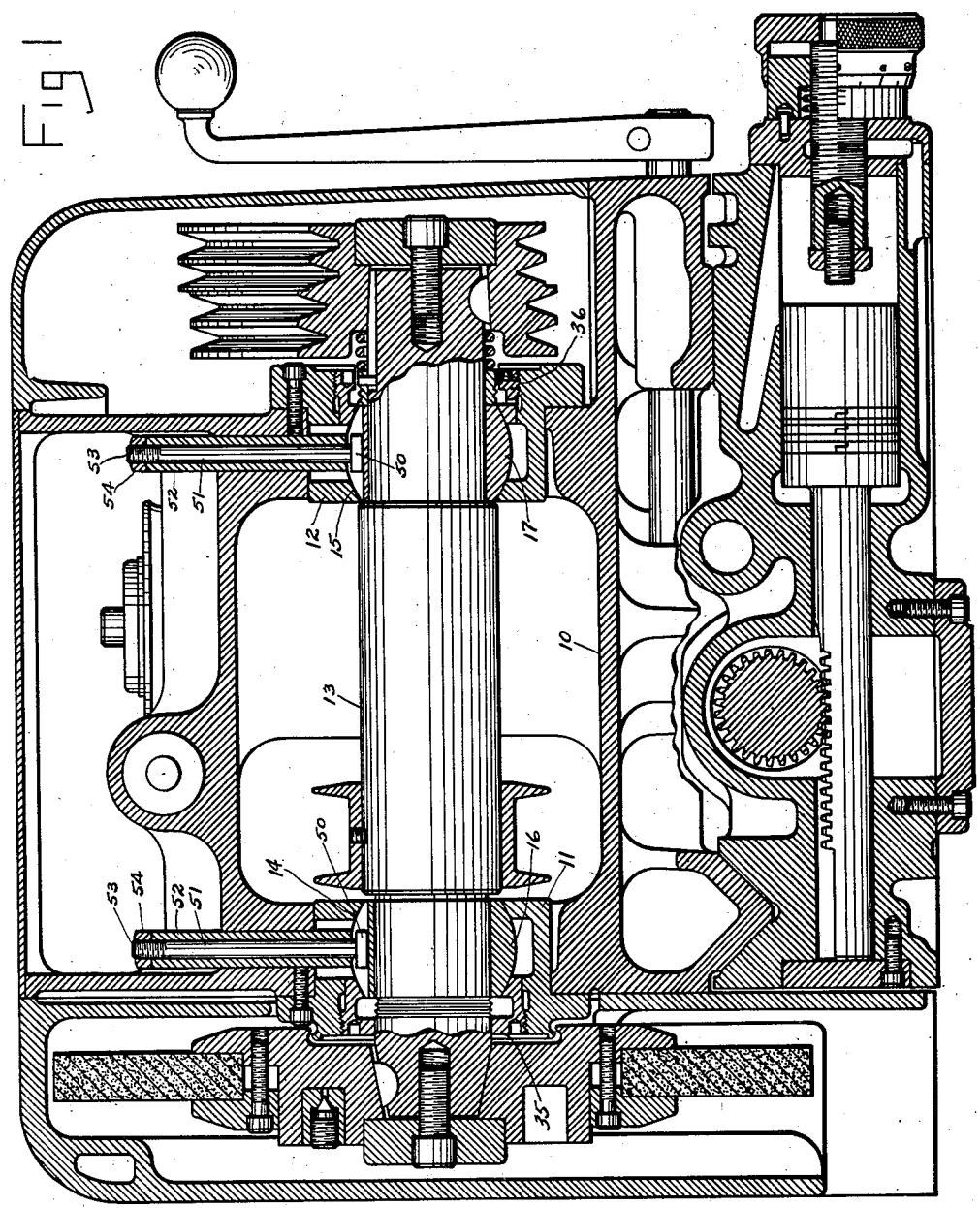
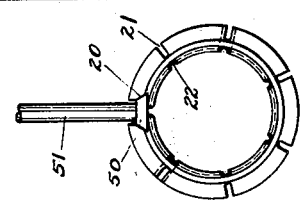
Inventor
AMOS P. STEINER
Attorney March 24, 1942.  A. P. STEINER  2,277,167
BEARING
Filed Nov. 24, 1939  3 Sheets-Sheet 2
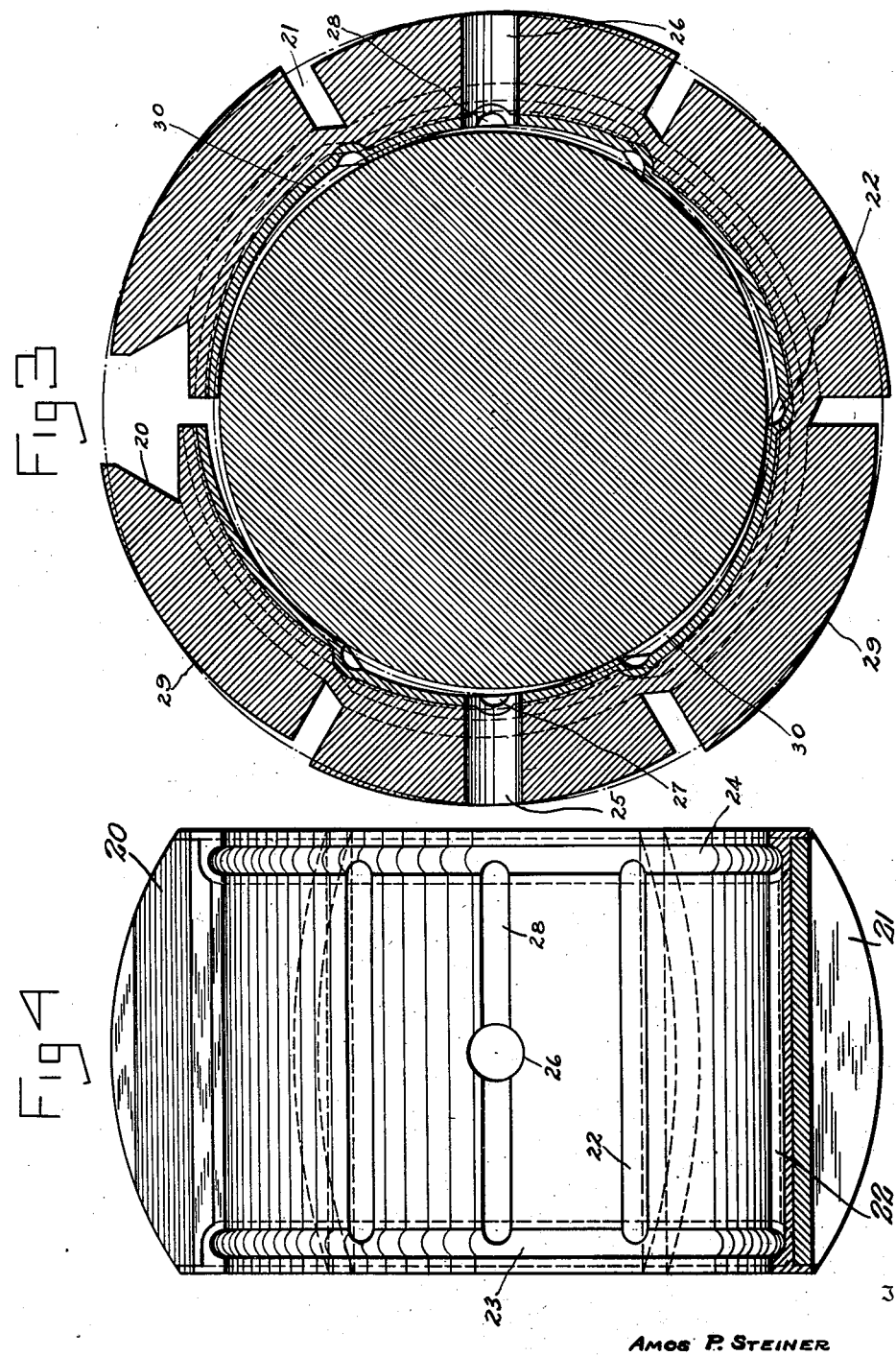
Inventor
AMOS P. STEINER
By Hugh N. Rocke
Attorney March 24, 1942.  A. P. STEINER  2,277,167
BEARING
Filed Nov. 24, 1939  3 Sheets-Sheet 3

Inventor
AMOS P. STEINER
By
Attorney

Patented Mar. 24, 1942

2,277,167

UNITED STATES PATENT OFFICE 2,277,167

BEARING

Amos P. Steiner, Waynesboro, Pa., assignor to Landis Tool Company, Waynesboro, Pa.

Application November 24, 1939, Serial No. 306,017

6 Claims. (Cl. 308—240)

My invention relates to spindle bearings, particularly for grinding wheel spindles.

It is an object of my invention to provide a bearing construction which will permit extremely close clearance.

A further object is to provide precision means for adjusting said bearings.

A further object is to provide a bearing which will support the spindle at a plurality of points spaced about the peripheral surface of the spindle.

A further object is to provide means for distributing lubricant over the surface of the bearing.

At the present time there are, aside from antifriction bearings, two general types of cylindrical bearings.

The first type may consist of a single cylinder or sleeve, or it may consist of two halves bolted together. In both these cases there is but a single line of contact between the journal or spindle and the bearing. A single film or wedge of lubricant is formed between the two surfaces. Since this wedge must travel quite a distance it must be relatively thick to begin with. Such a film or wedge requires a large clearance in order to insure adequate lubrication for this type of bearing (usually a thousandth of an inch per inch of diameter of the journal). Such a large clearance permits sufficient movement of the spindle therein to seriously affect the accuracy of a grinding operation. For example, in traverse grinding the feed may be adjusted to take a two thousandths cut. During the first pass of the wheel over the work, the spindle is crowded against one side of the bearing and after removing the desired amount of stock, the spindle moves forward within the bearing and removes additional stock from the work piece without further adjustment of the feed mechanism.

The second type of cylindrical bearing is what is commonly known as the multiple shoe type. It consists of a plurality of bearing shoes spaced about the surface of a spindle. With this type of bearing there are as many lines of contact with the spindle as there are shoes. The spindle is held rigidly and probably the center of the bearing and that of the spindle coincide. A separate oil wedge is formed for each shoe and since the film must be carried a comparatively short distance compared with that in the first type of bearing, the clearance can be kept to a minimum. Because of the number of parts and the work required on each part, this type of bearing is necessarily expensive.

My invention consists of a one piece bearing, having a slit lengthwise thereof to permit adjustment. The outer surface is curved axially and is supported on a surface or surfaces conforming thereto, thus providing for self-alignment. A plurality of spaced axial slots are cut in the outer surface of the bearing to reduce resistance to adjustment. Oil may be introduced at one or more points and conducted thru one or more peripheral grooves joining the axial grooves. Thus a series of oil wedges may be formed in the space between the axial grooves and the clearance between the spindle and the bearing may be reduced accordingly. The usual clearance with this type of bearing is half a tenth or less per inch of diameter or $\frac{1}{20}$ that of a conventional bearing. This construction gives the advantages of a multiple shoe bearing with the economy of construction of an ordinary plain bearing. Another advantage of this type of bearing is that in the event of failure of the lubricant supply, any bearing metal picked up by the spindle will be carried only as far as the nearest oil groove and thus it cannot pile up to a point where it would score the spindle. In a conventional bearing, metal so picked up would accumulate until the spindle would lock and the spindle surface would be so damaged as to require regrinding.

Figure 1 is a sectional front elevation of a wheel base.

Figure 2 is an end elevation of my bearing.

Figure 3 is an end elevation showing in an exaggerated manner, the appearance of my bearing in operation.

Figure 4 is a sectional front elevation of the bearing.

Figure 5:
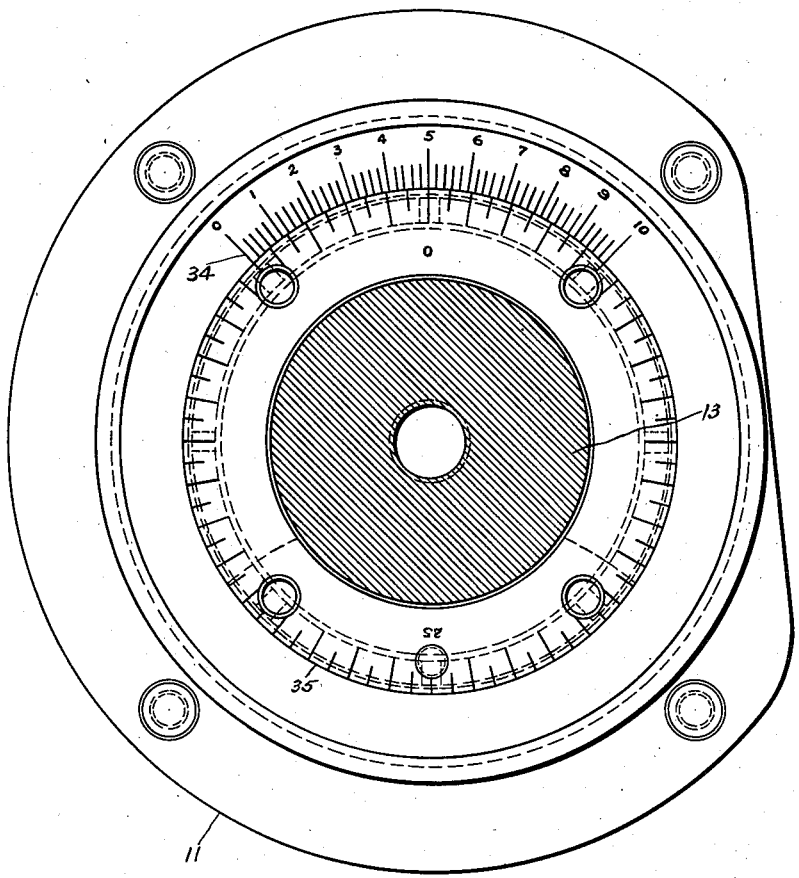
Figure 5 is an end view of the spindle mounting.

A wheel base 10 has inserted at opposite sides thereof and in axial alignment, a pair of bearing housings 11 and 12 each having an opening thru which a spindle 13 may pass. The inner edges 14 and 15 respectively of said openings are curved to conform to the outer surface of the bearings 16 and 17. Each of said bearings consists of a single cylindrical member having the outer surface curved in an axial direction. The inner surface is lined with babbitt or other suitable bearing substance. Said bearing is split axially to permit adjustment. A dovetail recess 20 is formed along said split. Spaced axial slots 21 are formed in the outer surface of said bearing. In radial alignment with said slots and on the inside surface of said bearing are spaced oil grooves 22 joined together by axially spaced internal peripheral grooves 23 and 24. Said grooves and slots form a plurality of segments 29. Lubricant is introduced into said bearings thru holes 25 and 26. Said holes open into axial grooves 27 and 28 located between the grooves 22. The reason for the relative location of the grooves 22 and slots 21 is to reduce the cross section at those points and thus permit the segments 29 formed thereby to flex and form a series of oil wedges 30 between said bearing and the spindle as shown in an exaggerated manner in Figure 3.

Said bearings are held in position and adjusted for clearance by means of nuts 35 and 36 calibrated to indicate magnitude of radial movement of the bearings 16 and 17. In this case, said nuts are graduated so that one revolution will change the clearance .050 inch. The vernier makes possible adjustments to one ten-thousandth inch. Said nuts are threaded into housings 11 and 12 and the portion thereof engaging the bearing is shaped to conform to the contour of the bearing. A vernier scale 34 on the housings 11 and 12 provides a zero point for the graduations on said nuts.

Means for increasing the clearance between the bearing and spindle consists of a cam 50 shaped to conform to the shape of the recess 20 and inserted therein. Said cam is supported at the end of a rod 51. Said rod passes thru a sleeve 52 which rests on the outer surface of said bearing and in turn passes thru the housing and the wheel base 10. The sleeve extends beyond the surface of said base and the rod has a threaded extension 53 beyond the end of the sleeve. A nut 54 on said threaded extension serves to draw up on said rod and thus cause cam 50 to urge the bearing to a position of greater clearance.

*Operation.*—Bearings 16 and 17 are placed in position on spindle 13. By means of nuts 35 and 36 said bearings are drawn down until all the clearance has been taken up. The nut is then backed off until the scale thereon indicates the desired clearance. Nuts 54 on threaded ends of rods 53 are turned down until the bearings have been expanded against the nut. The bearing is thus held firmly in position with a predetermined clearance between the bearing and the spindle. With this type of bearing the conventional clearance of .001" per inch diameter is reduced to about .00005" per inch.

I claim:
1. A spindle bearing for a metal working machine consisting of a cylindrical member split axially and having the outer surface curved in an axial direction, spaced axial slots in said outer surface, and oil grooves on the inner surface of said member parallel with the axis thereof and in radial alignment with said slots.

2. A spindle bearing for a metal working machine consisting of a cylindrical member split axially and having the outer surface curved in an axial direction, spaced axial slots in said outer surface, oil grooves on the inner surface of said member parallel with the axis thereof and in radial alignment with said slots, and annular grooves therein joining the ends of said axial grooves.

3. A spindle bearing for a metal working machine consisting of a cylindrical member split axially and having the outer surface curved in an axial direction, spaced axial slots in said outer surface, oil grooves on the inner surface of said member parallel with the axis thereof and in radial alignment with said slots, and an annular groove therein joining said axial grooves.

4. A spindle bearing for a metal working machine consisting of a cylindrical member split axially and having the outer surface curved in an axial direction, spaced axial slots in said outer surface, oil grooves on the inner surface of said member parallel with the axis thereof and in radial alignment with said slots, an annular groove therein joining said axial grooves, and means for supplying oil to said grooves.

5. In a metal working machine, the combination of a spindle, a spindle bearing consisting of a cylindrical member split axially and having the outer surface curved in an axial direction, spaced axial slots in said outer surface, oil grooves on the inner surface of said member parallel with the axis thereof and in radial alignment with said slots, and means for adjusting said bearing including a nut movable axially relative thereto, said nut bearing against said curved outer surface and graduations on said nut in terms of clearance between said bearing and said spindle.

6. A spindle bearing for a metal working machine consisting of a cylindrical member split axially, spaced axial slots in said outer surface, and oil grooves on the inner surface of said member parallel with the axis thereof and in radial alignment with said slots.

AMOS P. STEINER.